(12) United States Patent
Maginnis, Jr. et al.

(10) Patent No.: US 6,595,049 B1
(45) Date of Patent: Jul. 22, 2003

(54) THERMAL MASS FLOW SENSOR WITH IMPROVED SENSITIVITY AND RESPONSE TIME

(75) Inventors: Thomas O. Maginnis, Jr., Dracut, MA (US); Wilfred J. Baxter, Jr., Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/335,953

(22) Filed: Jun. 18, 1999

(51) Int. Cl.[7] ................................................ G01F 1/68
(52) U.S. Cl. ................ 73/202.5; 73/204.25; 73/204.27
(58) Field of Search ........................ 73/202, 202.5, 73/204.11, 204.12, 204.25, 204.27, 204.22, 204.21

(56) References Cited

U.S. PATENT DOCUMENTS

| | | | | |
|---|---|---|---|---|
| 4,487,062 A | * | 12/1984 | Olin et al. | 73/202 |
| 4,800,754 A | * | 1/1989 | Korpi | 73/202 |
| 5,142,907 A | * | 9/1992 | Hinkle | 73/204.12 |
| 5,285,673 A | * | 2/1994 | Drexel et al. | 73/1.16 |
| 5,693,880 A | * | 12/1997 | Maginnis, Jr. | 73/202.5 |
| 6,354,150 B1 | * | 3/2002 | Rudent et al. | 73/202.5 |

\* cited by examiner

*Primary Examiner*—Hezron Williams
*Assistant Examiner*—Corey D. Mack

(57) ABSTRACT

A thermal mass flow sensor having superior sensitivity and response time includes a flow sensor tube defining an interior channel for fluid flow between input and output ends, a heating element in thermal communication with a portion of the flow sensor tube for heating a fluid flowing through the tube, a pair of spatially compact thermal sensors located at the upstream and downstream ends of the heating element for sensing the temperature of the fluid flowing through the tube at their respective locations and providing a signal representative of the fluid temperature at those locations, and a pair of thermal grounding members on the flow sensor tube, yet positioned at specified locations substantially beyond the heated portion of the tube, for establishing reference temperatures for the fluid flowing therethrough at those locations.

8 Claims, 2 Drawing Sheets

THERMAL MASS FLOW SENSOR WITH IMPROVED SENSITIVITY AND RESPONSE TIME

TECHNICAL FIELD

The present invention relates to thermal mass flow sensors, and more particularly to thermal mass flow sensors which provide a uniform heater density over a specified length of a flow sensor tube.

BACKGROUND OF THE INVENTION

The mass flow rate of a fluid is known to be proportional to the amount of heat required to maintain a constant temperature increase in a fluid as it flows through a laminar flow channel. The heating power per unit length of a heated flow passageway in a thermal flow sensor is referred to herein as the heater density.

Various known thermal mass flow sensors employ a uniformly heated flow sensor tube with thermal sensors at various locations along the length of the heated tube. Still others include thermal grounding elements at the ends of the heated tube in order to hold the fluid at ambient temperature at least at those points. Depending on the location of the thermal grounding elements, this can have the counterproductive effect of dissipating much of the heat intended to be transferred into the fluid, thereby vastly reducing the sensitivity of the flow meter.

Blackett, Henry and Rideal[1] disclose a flow sensor tube which is uniformly heated along its length so as to establish a constant heater density. The ends of the sensor tube are thermally grounded to a surrounding a case which grips the tube at the sensor tube outer ends, forming a pair of thermal clamps which dissipate heat from the sensor tube. A zero-flow temperature distribution is established which reaches a maximum halfway through the tube and a minimum (i.e., ambient temperature) at the two clamped ends of the tube. When fluid flows through the tube, the fluid absorbs heat as it approaches the maximum temperature distribution point halfway through the tube and releases heat as it leaves the point of maximum temperature distribution. Temperature sensors (thermocouples) are placed at specific points along the sensor tube between the thermal clamps, preferably symmetrically spaced from the center of the tube and within the uniformly heated portion of the tube, to detect a difference in the temperature of the flowing fluid at the sensor locations. The temperature difference is proportional to the mass flow rate of the fluid.

[1]Blackett et al., "A Flow Method For Comparing The Specific Heats of Gases", Proc. R. Soc. London, A 126, pp. 319–354 (1930).

Blackett, Henry and Rideal thus solved the general problem of identifying the optimum location of a pair of point thermal sensors on any uniformly heated flow tube with thermal end clamps. However, because they did not consider a flow tube having thermal clamps outside of the uniformly heated portion of the tube, they did not realize the significance or the extent of the heat transferred at the ends of the heated portion of the tube.

It is apparent from the variety of designs for flow sensors that a complete understanding of the heat transfer between the flowing fluid and the flow sensor tube has not heretofore been reached or shown in the prior art, and therefore the optimum placement of thermal sensors and thermal grounding elements in order to obtain highest temperature sensitivity and fastest response time has not been determined.

U.S. Pat. No. 5,693,880 to Maginnis, Jr., assigned to the assignee of the present invention, discloses a mass flow meter that is relatively insensitive to the position of the thermal grounding elements on the sensor tube and to temperature fluctuations inside the sensor tube. The flow sensor of Maginnis, Jr. includes a split heater coil which is non-uniformly wound around the sensor tube, to provide a non-uniform heater density over the heated portion of the sensor tube. That design used spatially extended heater/sensor elements of non-uniform heater density to achieve an approximately triangular temperature profile along the sensor tube, to reduce sensor noise as well as sensitivity of the flow sensor to errors in the position of the thermal clamps.

SUMMARY OF THE INVENTION

The invention advances the state of the art beyond the Blackett, Henry and Rideal configuration by replacing their uniform heater which extends all the way to the thermal clamps with a centrally located uniform heater that does not extend all the way to the thermal clamps. The abrupt drop in heater density at the ends of the uniform heater region causes maximum flow-induced heat transfer between the flow sensor tube and the fluid therein precisely at those ends. The analysis of Blackett, Henry and Rideal of the optimum location for point temperature sensors is therefore not correct for a uniform heater that does not extend through the full length of the sensor tube between thermal clamps.

According to one aspect of the invention, there is provided a thermal mass flow sensor, comprising:

a) a flow sensor tube defining an inlet, an outlet, and an interior channel for fluid flow between the inlet and outlet;

b) a heating element in thermal communication with a portion of the flow sensor tube for heating a fluid flowing therethrough;

c) a pair of thermal sensors in thermal communication with the flow sensor tube, each sensor located at a respective end of the heating element on the flow sensor tube, for sensing the temperature of the fluid flowing through the flow sensor tube and providing a signal representative of the fluid temperature at the respective sensor locations; and d) a pair of thermal grounding members on the flow sensor tube beyond the ends of the heating element, for establishing respective inlet and outlet reference temperatures for the fluid flowing through the flow sensor tube at the respective locations of the thermal grounding members.

The heating element preferably comprises a heating coil which is substantially uniformly wound around the flow sensor tube and establishes a substantially uniform heater density over the portion of the flow sensor tube heated by the heating element.

The length of the heating coil is determined by the requirement of efficient heating of the fluid in the absence of flow. This is well known in the prior art. The full length of the sensor tube, as measured between the thermal clamp locations, is preferably approximately equal to twice the length of the portion of the sensor tube directly beneath the heating coil, and the heating coil is preferably substantially centered on the flow sensor tube.

The length of the thermal sensors is short relative to the length of the heated portion of the sensor tube. In one preferred embodiment, the thernmal sensors comprise matched thermistors. In an alternate embodiment, they comprise heat flux sensors.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be made to the following detailed description taken in connection with the accompanying drawings, in which.

Like elements in the drawings are indicated by like reference numerals.

DETAILED DESCRIPTION OF THE DRAWINGS

The flow sensor of the '880 patent features low noise and provides uniform flow-induced heat transfer over the extended lengths of two non-uniformly wound heater windings. The so-called tapered winding sensor of the '880 patent provides a low-noise signal with higher sensitivity than the prior art sensors, and comparable time response, yet does not provide the highest sensitivity or the most rapid response possible.

In contrast, the flow sensor of the present invention is designed to maximize sensitivity to flow and speed of response by concentrating the flow-induced heat transfer, as much as possible, to two specific points, at which very sensitive and compact (ideally, point-contact) temperature sensors are located. Those points are ideally located at the ends of a finite-length uniform heating element, provided that thermal grounding elements are located on the sensor tube outside of the heated portion of the sensor tube. The flow sensor of the present invention is thus useful in flow sensing applications in which flow sensitivity and speed of response are more important than a quiet signal.

Figure 1:
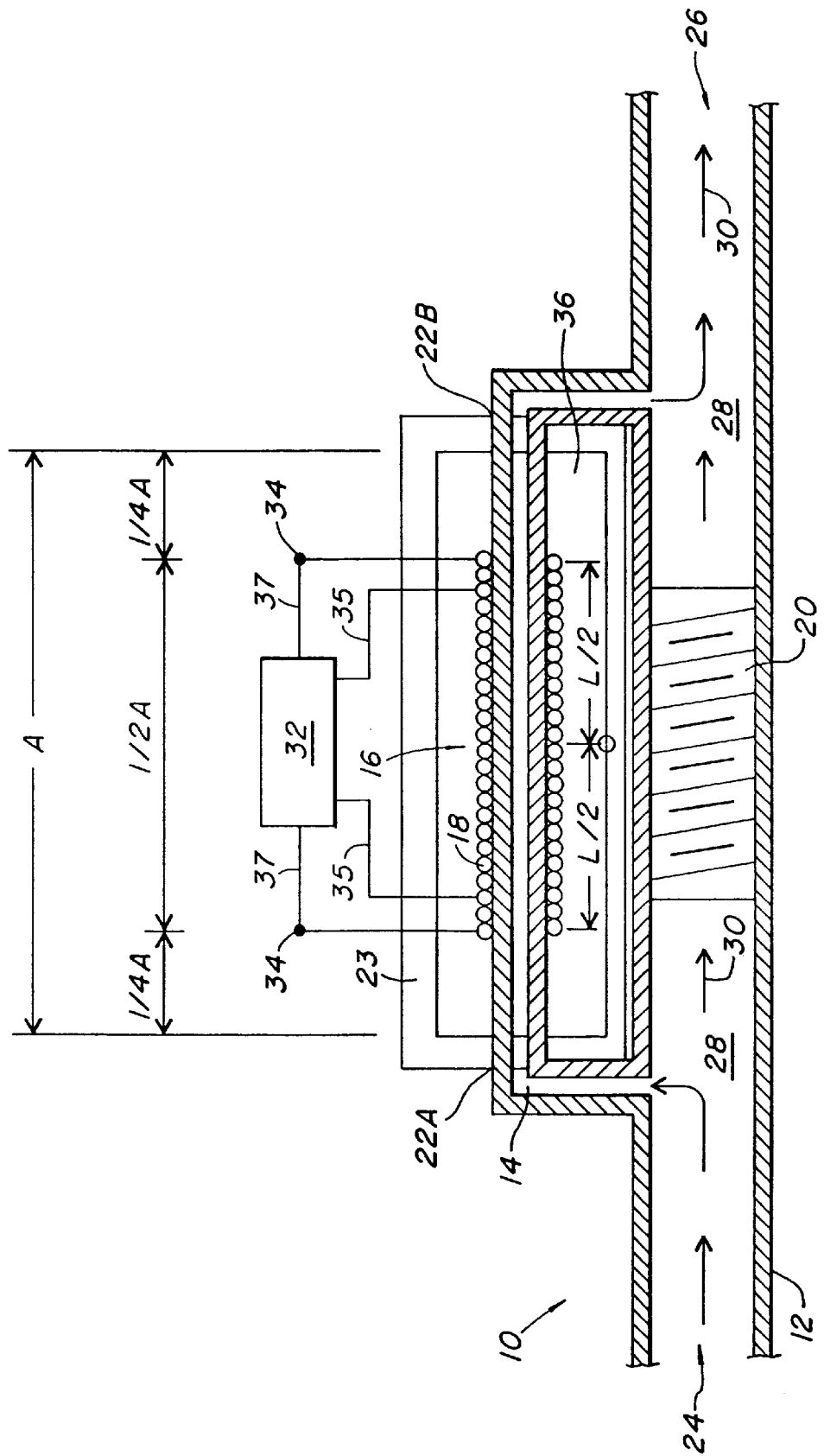
FIG. 1 is a side view of a thermal mass flow sensor according to the present invention.

FIG. 1 shows a sectional view of a thermal mass flow sensor 10, which includes a primary flow tube 12, a flow sensor tube 14, and a heating element 16 comprising one uniformly wound heating coil 18. A laminar flow bypass element 20 is disposed in the primary flow tube 12. A case or cover 23 is disposed over the sensor tube and is in thermal communication with the tube in two locations outside of the heated portion of the tube to function as a thermal clamp or grounding element 22 at those locations. The primary flow tube 12 defines a fluid inlet 24 and a fluid outlet 26 for a fluid 28 to flow from the inlet to the outlet in a downstream direction indicated by arrows 30. Laminar flow element 20 is disposed within the primary flow tube 12 and restricts the flow of fluid 28 through the tube 12 so that only laminar flow is established. An upstream end of flow sensor tube 14 couples to the primary flow tube 12 between the inlet 24 and laminar flow element 20, and a downstream end of flow sensor tube 14 couples to the primary flow tube 12 between laminar flow element 20 and the outlet 26. A fixed proportion of the total mass of fluid flowing from the inlet to the outlet flows through the flow sensor tube 14, which is typically (but not necessarily) of capillary dimensions and is fabricated from material characterized by a relatively high thermal conductivity (e.g., steel) in comparison to the thermal conductivity of the fluid 28.

The heater coil 18 comprises a resistive conductor that may, but need not, also be thermally sensitive and which is uniformly wound, preferably as densely as possible, around a portion of the flow sensor tube 14. Each successive turn of the heater coil is preferably placed as close as possible to the previous turn so that the coil is wound at a constant pitch. In the flow sensor illustrated in FIG. 1, heater coil 18 is disposed about the flow sensor tube and extends axially for a length L along the flow sensor tube 14, which has a total effective flow sensing length of A. In a preferred embodiment, detailed more fully below, the effective length of the flow sensor tube, A, is approximately equal to twice the length of the heating coil, L, as measured along the tube axis between the thermal clamps 22. The heating coil 18 is preferably centered on the flow sensor tube 14, so that approximately one-quarter of the length of the tube at each end is not directly in contact with the heating coil.

For convenience of illustration, the conductor of heater coil 18 is not drawn to scale, and the diameter of this conductor is typically much smaller, relative to the flow sensor tube 14, than is depicted in the drawings.

Mass flow sensor 10 also includes an electronic control circuit 32 which is connected to the heater coil 18 via conductive wires 35 and to the two thermal sensors 34 via conductive wires 37.

It has been shown that the maximum flow-induced heat transfer between the heating coil 18 and the fluid 28 occurs at specific locations. The graph of FIG. 3 indicates that the locations at which the flow-induced temperature difference between the flowing fluid and the sensor tube is the greatest, and thus the locations of maximum heat transfer between the sensor tube and the flowing fluid, are at the beginning and end of the heater coil, i.e., at $-L/2$ and $+L/2$, relative to the midpoint of the heater length, the midpoint being taken as the origin of the axial position coordinate. Thus, according to a preferred embodiment of the invention, the temperature sensors 34 are located, respectively, at the upstream and downstream ends of the heating coil 18 in order to provide the sensitivity and speed of response.

Figure 2:
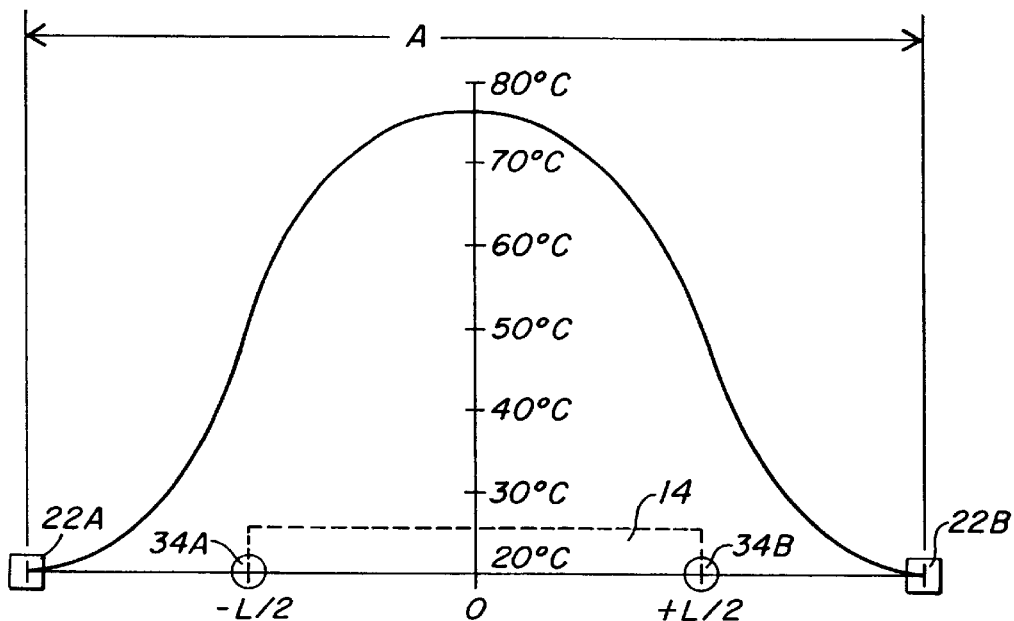
FIG. 2 is a graph illustrating fluid temperature as a function of axial position along the flow sensor tube.
Figure 3:
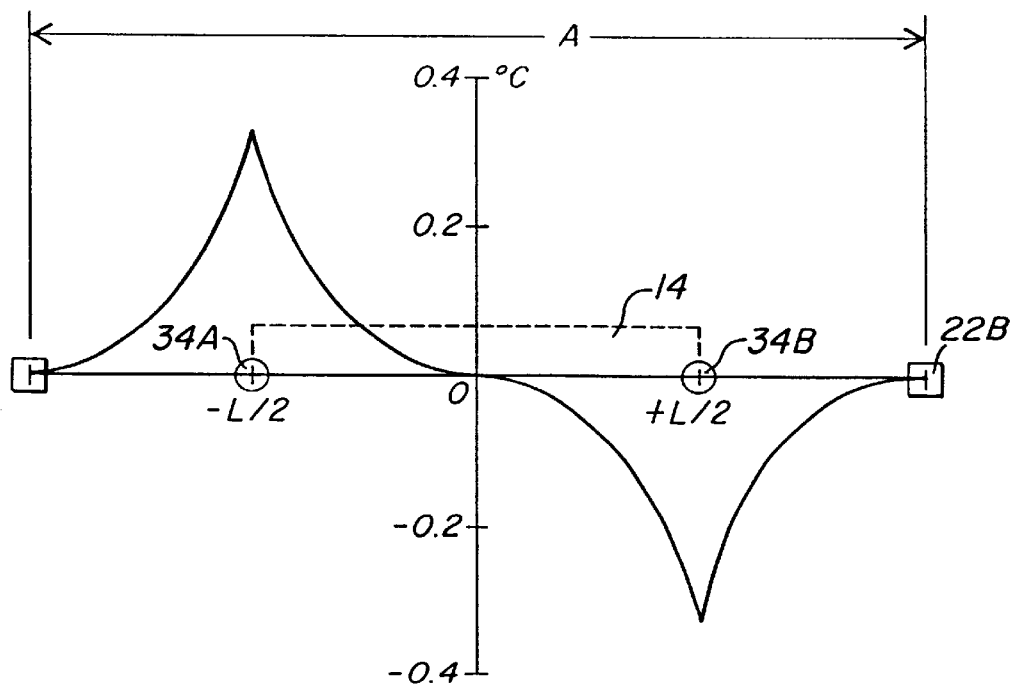
FIG. 3 is a graph illustrating the flow-induced difference in the temperatures of the flow sensor tube and the fluid as a function of position along the flow sensor tube.

The thermal casing 23 defines the effective length of the flow sensor tube with a pair of thermal clamps 22 (the upstream thermal clamp being designated 22A, and the downstream thermal clamp being designated 22B in FIGS. 1–3) in thermal contact with the flow sensor tube 14 so as to establish a thermal ground, or reference temperature, for the fluid flowing through the flow sensor tube. Thus, for optimum performance and efficiency of the meter, the thermal clamps 22 are preferably located some distance away from the points of maximum heat transfer between the heating coil 18 and the fluid 28, so that as much heat as possible is transferred from the heating coil to the fluid and is not conducted into the thermal clamps.

Thermal clamps 22 are typically fabricated from a material characterized by a relatively high thermal conductivity compared to the thermal conductivity of sensor tube 14. Thermal clamps 22 thus establish a thermal ground, or reference temperature, for the fluid as it flows into and out of the sensor tube.

The heating coil 18 is preferably wound around the desired portion of the flow sensor tube 14 at a substantially constant pitch to establish a substantially uniform heater density over the length of the sensor tube in proximity with the heating coil. In a preferred embodiment of the invention, the heating coil 18 is disposed over approximately half the effective length A of the flow sensor tube 14, so that approximately half the flow sensor tube is heated and half is unheated. More particularly, the heated portion of the flow sensor tube is substantially centrally located along the flow sensor tube, as shown in FIG. 1. The first and last quarter lengths of the flow sensor tube 14 are preferably not directly contacted by the heating coil.

The graph in FIG. 2 illustrates the temperature profile of the fluid 28 and flow sensor tube 14 with the heating coil 18 configured according to the preferred embodiment just described. The fluid is at approximately ambient temperature as it enters and exits the flow sensor tube 14. The thermal clamps 22 are preferably in thermal communication with the sensor tube 14 and are located at positions at which the fluid and tube temperatures are at or nearly at ambient. temperature so that minimum dissipation of heat from the heating coils occurs. The heating coil 18 preferably extends between −L/2 and +L/2 along the sensor tube (shown by a dotted line in the graphs of FIGS. 2 and 3). It can be seen that the temperature of the fluid and the sensor tube increases sharply at −L/2 and +L/2, and the slope of the temperature profile is steepest at −L/2 and +L/2.

The graph of FIG. 3 shows the flow-induced difference in temperature between the flow sensor tube 14 and the fluid 28 for every position along flow sensor tube length A. This temperature difference is typically much smaller than the temperature rise shown in FIG. 2 and is directly proportional to the mass flow rate of the fluid 28. It can be seen that the temperature difference is greatest at −L/2, where the tube is warmer than the fluid, and at +L/2, where the fluid is warmer than the tube. It follows that placement of relatively compact temperature sensors 34 at the points of maximum heat transfer between the flow sensor tube and the fluid will provide a flow meter with the greatest sensitivity and the fastest response time.

In operation, fluid 28 flows from the inlet 24 to the outlet 26 of the primary flow tube 12. A portion of the fluid flows through restrictive laminar flow element 20, and the remaining fluid flows through flow sensor tube 14 which branches out from the primary flow tube. Circuit 32 causes an electrical current to flow through heater coil 18 so as to generate and apply heat to a portion of sensor tube 14, as well as to the fluid 28 flowing therethrough. The fluid 28, which is normally at or near ambient temperature upon entering the inlet 24 of the primary flow tube, exchanges heat with the sensor tube, and it is warmed as it flows through the first half of flow sensor tube 14 and cooled as it flows through the second half of the sensor tube.

Circuit 32 detects the difference between the inlet and outlet temperatures as measured by the point sensors 34A, 34B and generates an output signal that is proportional to the mass flow rate of the fluid 28 flowing through the flow sensor tube 14. Since the fluid flowing through the flow sensor tube 14 is a fixed portion of the total amount of fluid flowing from the inlet 24 of the primary flow tube to the outlet 26, this output signal is also proportional to the total mass flow through the flow meter 10.

The present invention employs relatively compact, or so-called "point detector", thermal sensors in addition to the heater coil. Each of the thermal sensors senses the local temperature of the sensor tube, and thus of the fluid flowing inside the tube, at a single point only on the sensor tube. The heater coil of the present invention functions only as a heater, not as a temperature sensor, and therefore does not require a high temperature coefficient of resistance.

The flow sensor shown in FIG. 1 is similar to the prior art-flow sensor shown in FIG. 5 of the '880 patent to Maginnis, Jr. However, there are at least three important differences which are significant.

First, the '880 flow sensor employs two extended heater/sensors, whereas the present invention employs a single extended heater and two point sensors. The single heating coil adds heat to the fluid so as to establish a symmetrical temperature distribution profile, with a peak temperature occurring at a location corresponding to the center of the heating coil. The thermal sensors, which are relatively compact in relation to the length of the heated portion of the sensor tube, indicate the fluid temperature at specific locations. The use of relatively compact thermal sensors at −L/2 and +L/2 means that the heater coil 18 is used primarily for heating and need not act as a temperature sensor for the fluid, as it is not being used to indicate temperature changes of the fluid as a function of its resistivity. Thus, the heater coil need not be made of a material which possesses a high temperature coefficient of resistance, and can thus be obtained at lower unit cost.

Second, the '880 flow sensor is designed to achieve low noise by means of spatially uniform flow-induced heat transfer using two extended heater coils. In contrast, the present invention is designed to achieve higher sensitivity and quicker response by means of spatially concentrated flow-induced heat transfer from two point sources of heat.

Third, in the flow sensor of the present invention the thermal clamps 22 are located outside the heated portion of the sensor tube. The ideal location of the thermal clamps is determined by the thermal characteristics of the sensor tube. However, the clamps should not be placed too close to the ends of the heater coil, so that they do not reduce the temperature difference at those points. They should not be located farther than is thermally necessary from the ends of the coil so that the sensor tube is not unnecessarily long. FIG. 3 illustrates the advantage of locating the thermal clamps at points at which the fluid and tube temperatures are approximately ambient, so as to minimize heat losses through the clamps and therefore maximize the heat transfer into the fluid, thereby improving the sensitivity and responsiveness of the flow meter.

The prior art mass flow sensor illustrated in FIG. 5 of the '880 patent does not include the above features and in fact teaches away from the placement of relatively compact thermal sensors at the upstream and downstream ends of a uniform heater. The '880 patent also teaches away from the placement of thermal clamps substantially beyond the ends of the heater. In addition, the prior art mass flow sensor of FIG. 5 of the '880 patent discloses the use of so-called "extended" thermal sensors which function as both heaters and temperature sensors and which extend over a finite distance that occupies substantially the entire sensor tube length between the thermal clamp locations.

In general, all of the components of the flow sensor tube 14 can be easily installed on an existing fluid conduit without disturbing fluid flow or opening the conduit. The flow sensor of the present invention thus has commercial potential as an aftermarket flow direction indicator or flow detector with directional capability. It can be installed on existing piping of any size for either laminar or turbulent flows. It would be most convenient for tubing of diameters ranging from ¼ inch to 2 inches.

The use of relatively compact thermal sensors in the mass flow meter of the present invention, and their location at the ends of the heating element, which are the points of maximum heat transfer between the sensor tube and the flowing fluid, are advantageous, for example, in making a quick and relatively easy approximation of fluid flow rate in an existing conduit. A commercially available heating tape can be wrapped around the conduit, and two point source thermal sensors can be glued at each end of the heating tape. A thermal grounding element or case can be included at the appropriate location as needed to establish a reference temperature for the fluid. This arrangement is relatively simple and quick to install and provides a good rough approximation of the flow rate. See, for example, U.S. Pat. No. 5,741,968 to Arai and assigned to the assignee of the present invention. For an illustration of such a retrofitted case. Note that this patent does not disclose or suggest the use of a uniform heater with endpoint thermal detectors or the location of those claims as specified in the present invention disclosure.

For an example of point temperature sensors in the general case, for a flow sensor tube having an outer diameter of 0.018 inch, a pair of small bead thermistors having an oval shape and dimensions of 0.014 inch by 0.020 inch made by Fenwal Electronics can be used. The thermistors can be glued directly to the flow sensor tube at the appropriate locations using a commercially available thermally conductive adhesive.

The flow sensor tube of the present invention can be made longer as needed to accommodate, for example, higher fluid temperatures if a heater of limited power per unit length is used. The use of relatively compact thermal sensors at the upstream and downstream ends of the heater coil eliminates any dependency of the output of the thermal sensors on the total length of the heating element, above a certain minimum length.

Because a uniform heater winding is used in the mass flow meter of the present invention, a uniform heater current will occur throughout the heated region of the flow sensor tube. There is no need to use high temperature coefficient heater wire, and thus the cost of materials is reduced. Moreover, because thermistors typically have higher temperature coefficients of resistance than wire wound resistors, a given temperature difference between the upstream and downstream thermal sensors will produce an output signal of greater magnitude with matched thermistor sensors than with wire wound sensors at the same locations. Compounded with a higher temperature difference between the flow sensor tube and the fluid flowing therethrough, this feature will produce a greater relative signal.

As will be evident to those having ordinary skill in the art, it is also possible to use heat flux sensors in place of the point temperature sensors.

Because certain changes may be made in the above apparatus without departing from the scope of the invention herein disclosed, it is intended that all matter contained in the above description or shown in the accompanying drawings shall be interpreted in an illustrative and not a limiting sense.

We claim:

1. A thermal mass flow sensor, comprising:
   a) a flow sensor tube defining an input end, an output end, and an interior channel for fluid flow between the input and output ends;
   b) a heating element in thermal communication with a portion of the flow sensor tube for heating a fluid flowing therethrough, the heating element being made of a material having a low temperature coefficient of resistance and providing a heat density distribution along the portion of the flow sensor tube;
   c) a pair of thermal sensors, separate from the heating element, in thermal communication with the flow sensor tube, each sensor located at a respective end of the heating element on the flow sensor tube, for sensing the temperature of the fluid flowing through the flow sensor tube and providing a signal representative of the fluid temperature at the respective thermal sensor locations; and
   d) a pair of thermal grounding members on the flow sensor tube spaced a predetermined distance from the ends of the heating element for establishing respective inlet and outlet reference temperatures for the fluid flowing through the flow sensor tube substantially independently of the heat density distribution provided by the heating element along the portion of the flow sensor tube.

2. A thermal mass flow sensor according to claim 1, wherein the heating element comprises a heating coil which is substantially uniformly wound around the flow sensor tube and establishes a substantially uniform heater density over the portion of the flow sensor tube in direct contact with the heating element.

3. A thermal mass flow sensor according to claim 2, wherein the effective length between the thermal grounding members, is approximately equal to twice the length of the heating coil.

4. A thermal mass flow sensor according to claim 3, wherein the heating coil is substantially centered between the thermal grounding members.

5. A thermal mass flow sensor according to claim 4, wherein the length of the portion of thermal sensors on the sensor tube is short relative to the length of the portion of the flow sensor tube in direct contact with the heating coil.

6. A thermal mass flow sensor according to claim 5, wherein the thermal sensors comprise matched thermistors.

7. A thermal mass flow sensor according to claim 5, wherein the thermal sensors comprise heat flux sensors.

8. A thermal mass flow sensor, comprising:
   a) a flow sensor tube defining an input end, an output end, and an interior channel for fluid flow between the input and output ends;
   b) a heater arrangement, in thermal communication with a portion of the flow sensor tube that heats a fluid flowing therethrough so as to provide a heat density distribution along the portion of the flow sensor tube;
   c) a pair of thermal sensors, separate from the heater means, in thermal communication with the flow sensor tube, each sensor located at a respective end of the heater means on the flow sensor tube, for sensing the temperature of the fluid flowing through the flow sensor tube and providing a signal representative of the fluid temperature at the respective thermal sensor locations; and
   d) a pair of thermal grounding members on the flow sensor tube spaced a predetermined distance from the ends of the heater means for establishing respective inlet and outlet reference temperatures for the fluid flowing through the flow sensor tube substantially independently of the heat density distribution provided by the heater means along the portion of the flow sensor tube.

* * * * *